(12) United States Patent
Khanvilkar et al.

(10) Patent No.: US 8,898,772 B2
(45) Date of Patent: Nov. 25, 2014

(54) METHODS AND STRUCTURE FOR IMPLEMENTING SECURITY IN SYSTEMS THAT UTILIZE SMALL COMPUTER SYSTEM INTERFACE ENCLOSURE SERVICES

(75) Inventors: Saurabh B. Khanvilkar, Thane (IN); Mandar Joshi, Maharashtra (IN); Kaushalender Aggarwal, Haryana (IN)

(73) Assignee: LSI Corporation, Milpitas, CA (US)

( * ) Notice: Subject to any disclaimer, the term of this patent is extended or adjusted under 35 U.S.C. 154(b) by 282 days.

(21) Appl. No.: 13/487,516

(22) Filed: Jun. 4, 2012

(65) Prior Publication Data
US 2013/0326615 A1     Dec. 5, 2013

(51) Int. Cl.
*H04L 29/06* (2006.01)
*G06F 7/04* (2006.01)
*G06F 15/16* (2006.01)
*G06F 17/30* (2006.01)

(52) U.S. Cl.
USPC .................. 726/21; 726/9; 709/212; 709/215

(58) Field of Classification Search
None
See application file for complete search history.

(56) References Cited

U.S. PATENT DOCUMENTS 6,526,489 B1 * 2/2003 Kikuchi et al. ............... 711/164
7,818,436 B2 10/2010 Gallant et al.
2003/0126225 A1 * 7/2003 Camble et al. ................ 709/215
2005/0091333 A1 * 4/2005 Kobayashi et al. ........... 709/212
2012/0102561 A1 * 4/2012 Butt ................................. 726/9

OTHER PUBLICATIONS

"T10/1731-D Revision 24" Apr. 14, 2010 Working Draft SCSI Primary Commands—4 (SPC-4).
"Pre-FC-SP Policy Implementations Annex (FMPS)" Dec. 8, 2003 T11/03-807v0.

* cited by examiner

*Primary Examiner* — Shin-Hon Chen
(74) *Attorney, Agent, or Firm* — Duft Bornsen & Fettig LLP

(57) ABSTRACT

Methods and structure are provided for implementing security features in SCSI Enclosure Services (SES) systems. The system comprises an SES device server, which includes a frontend interface, control unit, and backend interface. The frontend interface is operable to receive SES commands generated by Small Computer System Interface (SCSI) devices, and the backend interface is operable to manage operations of at least one peripheral device communicatively coupled with the SES device server based on received SES commands. The control unit is operable to determine whether a SCSI initiator that generated an SES command is an authorized device. The control unit is further operable to perform the SES command in response to determining that the SCSI initiator is an authorized device, and is further operable to reject the SES command in response to determining that the SCSI initiator is not an authorized device.

20 Claims, 5 Drawing Sheets

FIG. 4

SAS SECURITY TABLE

| FROM SAS ADDRESS | TO SAS ADDRESS | FROM SES PAGE CODE | TO SES PAGE CODE | STATUS REQUEST ONLY |
|---|---|---|---|---|
| 0x500A05BC00123400 | 0x500A05BC00123409 | 00h | FFh | TRUE |
| 0x500A05BC001234BF | 0x500A05BC001234FF | 03h | 0Eh | TRUE |
| 0x500A05BB00327434 | 0x500A05BB99002849 | 05h | 08h | FALSE |
| 0x500A05BC037501BF | 0x500A05BC052501FE | 00h | 0Dh | TRUE |
| 0x500A05BC00000000 | 0x500A05BC000000FF | 0Eh | 0Eh | TRUE |

410

TCP/IP SECURITY TABLE

| IP ADDRESS OF INITIATOR | FROM SES PAGE CODE | TO SES PAGE CODE | STATUS REQUEST ONLY |
|---|---|---|---|
| 192.168.1.105 | 00h | FFh | FALSE |
| 192.168.1.32 | 03h | 0Eh | TRUE |
| 192.168.1.167 | 05h | 08h | FALSE |
| 192.168.1.154 | 00h | 0Dh | FALSE |
| 192.168.1.243 | 0Eh | 0Eh | FALSE |

420

METHODS AND STRUCTURE FOR IMPLEMENTING SECURITY IN SYSTEMS THAT UTILIZE SMALL COMPUTER SYSTEM INTERFACE ENCLOSURE SERVICES

BACKGROUND

1. Field of the Invention

The invention relates generally to Small Computer System Interface (SCSI) systems, and more specifically relates to SCSI systems that utilize SCSI Enclosure Services (SES).

2. Discussion of Related Art

In SCSI systems, it is common to physically integrate SCSI devices (e.g., SCSI target devices) and associated components into an enclosure such as a drawer of a rack-mounted storage system. The enclosure is often managed as a single unit by an administrator of the system, such that the entire enclosure may be swapped whenever servicing or replacement of a drive within the enclosure is desired. SCSI Enclosure Services (SES) are used to manage peripheral, non-SCSI electronic components used for such enclosures. Such peripheral components typically help to enable or enhance the operation of various SCSI devices (e.g., storage devices). By providing enclosure services, the peripheral components may establish a desired mechanical environment and/or electrical environment for the SCSI devices. The peripheral components may further serve as external indicators and controls that help to enable proper operation and maintenance of SCSI devices within the system. For example, these peripheral electronic components may include power supplies, cooling devices, displays, indicators, etc. SES device servers manage the operations of the various peripheral components, and may further alter the configuration of the peripheral components based upon received SES commands from SCSI initiators. For example, an SES device server may increase or decrease the speed of a cooling fan based on a received SES command from a SCSI initiator.

Unfortunately, SES systems do not include methods for prioritizing commands from different SCSI initiators. This means that different SCSI initiators may send conflicting commands to the SES device server, which may result in system instability. Additionally, SES device servers as presently implemented process any and all SES commands that are received. Therefore, if a malicious SCSI initiator is connected to the SCSI system, the malicious SCSI initiator may cause the enclosure (via the SES device server) to overheat, lose power, etc. in order to interfere with the operations of the system.

Thus it is an ongoing challenge to manage SES commands from SCSI initiators in a secure manner.

SUMMARY

The present invention addresses the above and other problems, thereby advancing the state of the useful arts, by providing methods and structure for implementing security features for systems that implement SES. Specifically, an SES device server keeps track of valid SCSI initiators that are allowed to provide SES commands. When the SES device server receives an SES command, it checks to see if the SCSI initiator that sent the command is authorized. If the SCSI initiator is authorized, then the SES command may be performed. Otherwise, the SES command is rejected.

In one aspect hereof, a system is provided for implementing security features in a SCSI Enclosure Services (SES) architecture. The system comprises an SES device server, which includes a frontend interface, control unit, and backend interface. The frontend interface is operable to receive SES commands generated by Small Computer System Interface (SCSI) initiators, and the backend interface is operable to manage operations of at least one peripheral device communicatively coupled with the SES device server based on received SES commands. The control unit is operable to determine whether a SCSI initiator that generated an SES command is an authorized device. The control unit is further operable to perform the SES command in response to determining that the SCSI initiator is an authorized device, and is further operable to reject the SES command in response to determining that the SCSI initiator is not an authorized device.

Another aspect hereof provides a method for implementing security features in a SCSI Enclosure Services (SES) architecture. The method includes receiving, at a frontend interface of an SES device server, SES commands generated by Small Computer System Interface (SCSI) devices. The method also includes determining whether SCSI initiators that generated SES commands are authorized devices. Further, the method includes performing an SES command in response to determining that a SCSI initiator that generated the SES command is an authorized device, and rejecting an SES command in response to determining that a SCSI initiator that generated the SES command is not an authorized device.

BRIEF DESCRIPTION OF THE DRAWINGS

FIG. 4 is a block diagram illustrating exemplary security tables used to authorize SCSI initiators in accordance with features and aspects hereof.

DETAILED DESCRIPTION OF THE DRAWINGS

Figure 1:
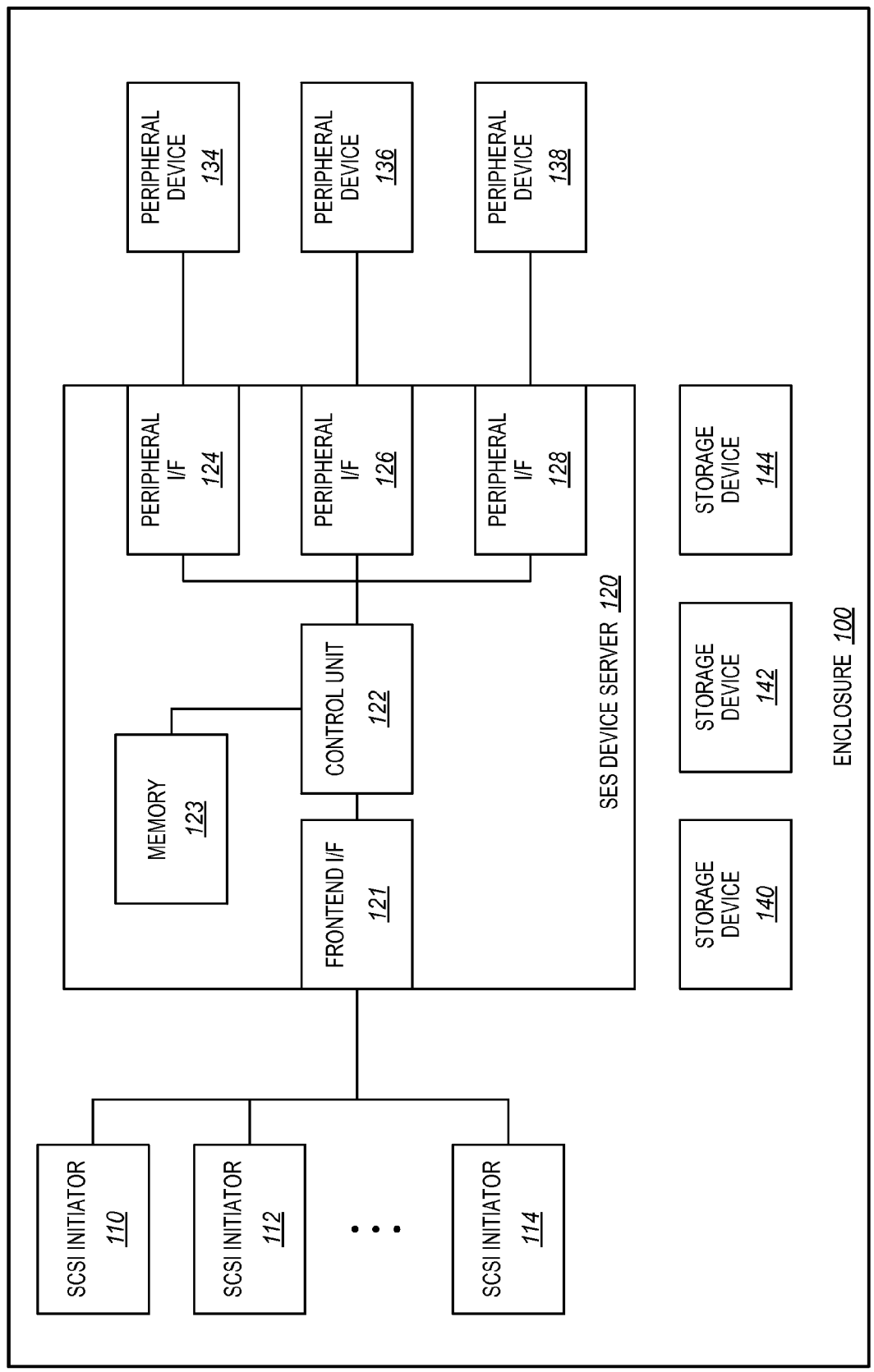
FIG. 1 is a block diagram of an exemplary SCSI architecture in accordance with features and aspects hereof.

FIG. 1 is a block diagram of an exemplary SCSI architecture in accordance with features and aspects hereof. The SCSI architecture of FIG. 1 includes one or more SCSI initiators 110-114, SCSI Enclosure Services (SES) device server 120, one or more peripheral devices 134-138, and one or more storage devices 140-144 located within enclosure 100. The SCSI architecture of FIG. 1 has been enhanced to enable SES device server 120 to implement security features which prevent unauthorized SCSI initiators from manipulating and/or viewing the status of peripheral devices 134-138.

While SES device server 120 is used to manage the peripheral, non-SCSI devices of an "enclosure," it remains important to note that in accordance with SES standards, the issue of whether devices are part of an "enclosure" or not is a logical concept. Thus, whether the various peripheral devices, SCSI initiators, and other components of enclosure 100 are located within a single physical housing is an immaterial consideration.

SCSI initiators 110-114 comprise any number and/or form of SCSI-compatible devices capable of generating SES commands. For example, a SCSI initiator may comprise a Host Bus Adapter (HBA) or a storage controller integrated into a storage system along with one or more enclosures. Often, SCSI initiators 110-114 will utilize Serial Attached SCSI (SAS) protocols or TCP/IP protocols to provide generated SES commands to SES device server 120.

SES messages generated by SCSI initiators 110-114 may be provided directly to frontend interface (I/F) 121 of SES device server 120, or may be routed to SES device server 120 via one or more switched fabrics (e.g., a SAS switched fabric). A switched fabric may comprise any suitable combination of communication channels operable to route communications, for example, according to protocols for SAS, Fibre Channel, Ethernet, ISCSI, etc.

Frontend I/F 121 comprises circuitry and associated logic capable of receiving incoming SES commands provided by SCSI initiators 110-114. For example, if SCSI initiators 110-114 utilize a switched SAS fabric, frontend I/F 121 may be capable of receiving and generating communications according to the protocol used by the switched fabric.

Control unit 122 comprises any system, component, or device operable to manage the operations of SES device server 120. Control unit 122 may be implemented, for example, as custom circuitry, as a special or general purpose processor executing programmed instructions stored in an associated program memory, or some combination thereof. Control unit 122 has been enhanced to process incoming SES commands received via frontend I/F 121, and to determine whether a SCSI initiator that generated the SES command is an authorized device. Control unit 122 may, for example, review address information in upper layers of the received command (e.g., the interface layer or transport layer) to determine the address of the SCSI initiator that generated the request, and may further process or reject the SES command based on whether the address matches an authorized address stored in memory 123. Memory 123 comprises any system, component, or device capable of storing and/or retrieving data in a computer-readable format accessible to control unit 122. For example, memory 123 may comprise a magnetic hard disk, solid state drive, optical media, Random Access Memory (RAM), etc.

If control unit 122 determines that an SES command was received from an authorized device, control unit 122 performs the SES command. For example, if the SES command is to manipulate one or more of peripheral devices 134-138, control unit 122 may direct the operations of one or more backend interfaces such as peripheral interfaces (I/Fs) 124-128 to change the configurations of those peripheral devices (e.g., to adjust the speed of a fan, change the amount of power supplied to the enclosure by a peripheral device, etc.). Backend interfaces such as peripheral interfaces 124-128 comprise any suitable interfaces that may be used to communicate with peripheral devices 134-138. For example, peripheral interfaces 124-128 may comprise circuitry implementing electronic signaling pathways used to transmit control signals to peripheral devices 134-138.

Peripheral devices 134-138 comprise any suitable systems, components, or devices that establish the mechanical environment, electrical environment, and/or external indicators and controls for the proper operation and maintenance of devices within enclosure 100. For example, peripheral devices 134-138 typically comprise fans, power supplies, temperature sensors, etc.

In this exemplary embodiment, enclosure 100 further includes storage devices 140-144. Such storage devices may provision the storage capacity of various logical volumes implemented via the SCSI architecture, and may comprise any media and/or interfaces capable of storing and/or retrieving data in a computer-readable format. For example, storage devices 140-144 may comprise magnetic hard disks, solid state drives, optical media, etc. compliant with protocols for one or more of SAS, SATA, Fibre Channel, etc. SCSI initiators (e.g., SCSI initiators 110-114) may access storage devices 140-144 to store data and to retrieve previously stored data.

Note that the particular arrangement of components described herein is merely intended to be exemplary, and one of ordinary skill in the art will appreciate that the specific arrangement and configuration of SCSI architecture devices is merely a matter of design choice.

Figure 2:
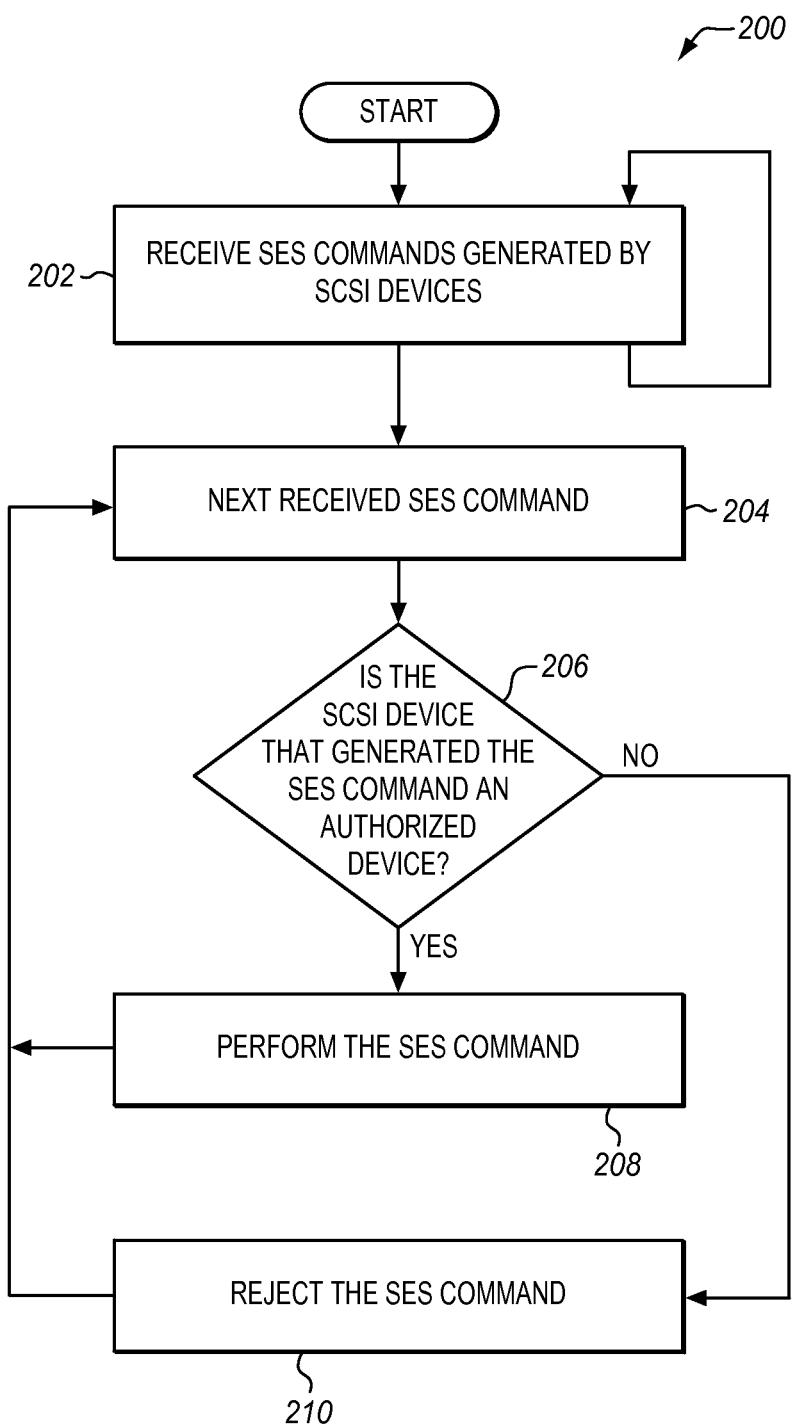
FIG. 2 is a flowchart describing an exemplary method in accordance with features and aspects hereof to implement security features for SES systems.

FIG. 2 is a flowchart describing an exemplary method in accordance with features and aspects hereof to implement security features for SES systems. The method of FIG. 2 may be operable in a SCSI architecture such as described above with regard to FIG. 1. Step 202 comprises receiving, at a frontend interface of an SES device server, SES commands that have been generated by SCSI initiators. These SES commands may be received, for example, via Serial SCSI Protocol (SSP), TCP/IP communications, etc. Step 202 may be performed in parallel and/or asynchronously from steps 206-210 described below.

Step 204 comprises selecting a received SES command for processing. Typically, SES commands will be processed by the SES device server on a first-come, first-served basis, although in some embodiments, received SES commands may be processed in a different order (e.g., based on priority information).

Step 206 comprises determining, at the SES device server, whether the SCSI initiator that generated the SES command is an authorized device. In one embodiment, a control unit of the SES device server analyzes the SES command to determine an identifier (e.g., SAS address, IP address, World Wide Name (WWN), Globally Unique Identifier (GUID), etc.) of the SCSI initiator that generated the command. The control unit then compares the identifier of the SCSI initiator to data at a table stored in memory that indicates a set of authorized SCSI initiators. If the identifier matches that of an authorized SCSI initiator, then the SCSI initiator is an authorized device.

If the SCSI initiator is an authorized device, processing may continue as indicated in step 208. This may comprise, for example, altering a state of a peripheral device managed by the SES device server, reporting the status of a peripheral device, etc.

However, if the device that generated the SES command is not an authorized device, processing may continue to step 210, where the SES device server rejects the SES command. Rejecting the SES command may include discarding the SES command and not sending a reply to the SCSI initiator that generated the command, or may comprise transmitting an SES FAIL or vendor specific response to the SCSI initiator that generated the command. In certain embodiments, if the SCSI initiator is an unauthorized device, the SES device server may transmit a notification to an operator of the system (or otherwise may log information) indicating the nature of the attempted unauthorized access as well as the identity (e.g., address) of the unauthorized SCSI initiator.

After processing the SES command, the SES device server may select a next SES command to see if it was generated by an authorized device, at step 204. Although the processing shown in FIG. 2 is substantially serial, in some embodiments the SES device server may process multiple received SES commands in parallel and/or asynchronously to determine whether those commands are authorized or not.

In a further embodiment, the SES device server may store passcode information that is used to register various SCSI initiators as authorized devices. For example, the passcode information may comprise a predefined password or set of passwords, a cipher used to determine whether a received password is valid, or any other cryptographic system. Different passcodes may correlate with different tiers of access to a set of peripheral devices, or may correlate with allowing access to different sets of peripheral devices.

In this embodiment, the SES device server may receive a vendor-specific SES communication that includes its own passcode information. The SES device server may then compare the received passcode information to the passcode information in memory. If the comparison/analysis indicates that the received passcode information is valid (i.e., if there is a match), then the SES device server may register the SCSI initiator as an authorized device at the appropriate level of authorization (e.g., a level that permits access to certain corresponding peripheral devices and/or permits certain types of access to certain corresponding peripheral devices). In still further embodiments, a received SES communication may identify multiple SCSI initiators, and may provide different passcodes for each SCSI initiator (in order to grant a different level of access to each SCSI initiator). The SES device server may therefore register the SCSI initiators as authorized devices, but at different tiers/levels of access.

Figure 3:
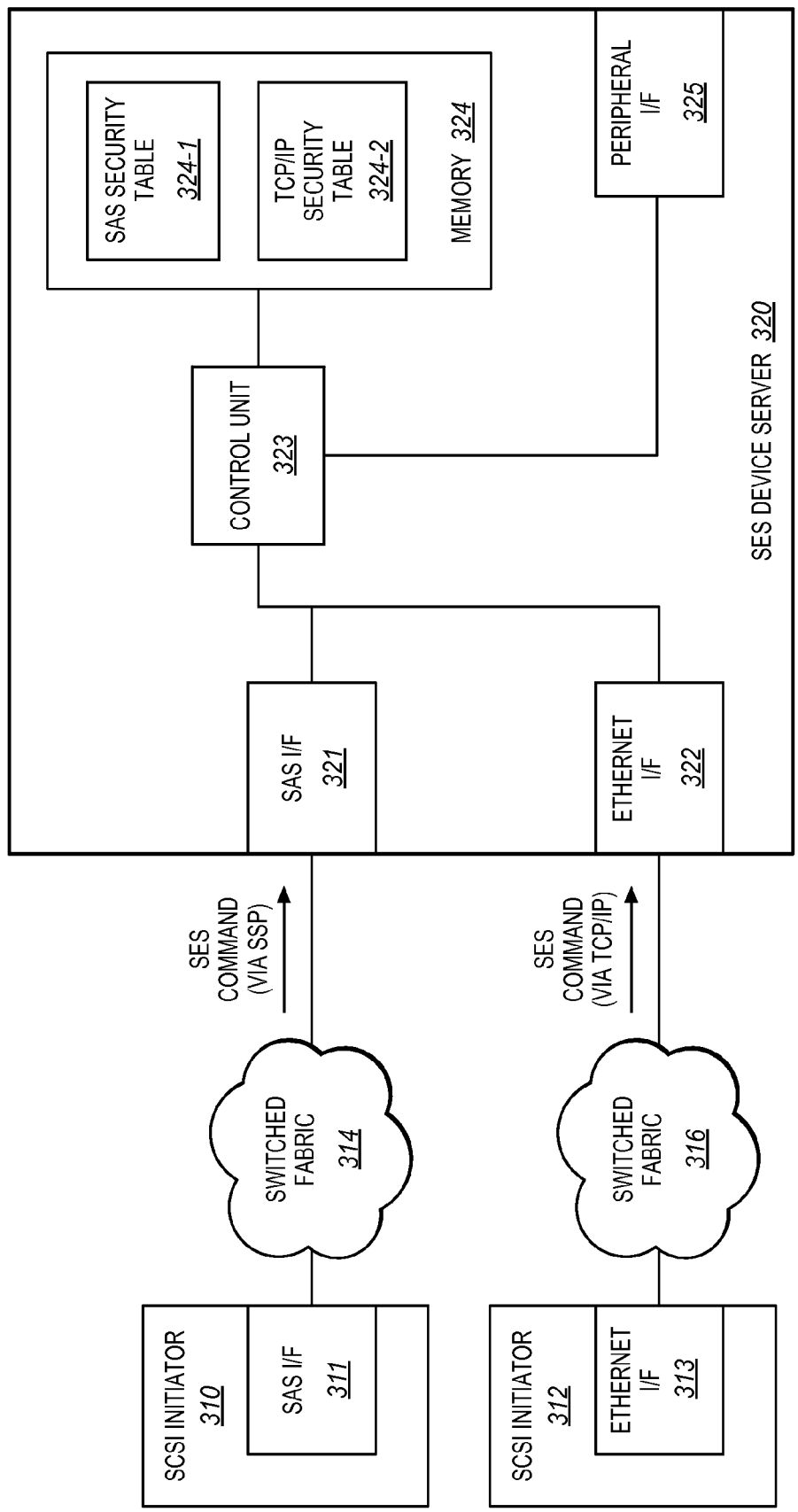
FIG. 3 is a block diagram of a further exemplary SCSI architecture in accordance with features and aspects hereof.

FIG. 3 is a block diagram of a further exemplary SCSI architecture in accordance with features and aspects hereof. According to FIG. 3, SCSI initiator 310 utilizes SAS interface (I/F) 311 to provide SES commands to SES device server 320 via switched SAS fabric 314. Further, SCSI initiator 313 utilizes Ethernet interface (I/F) to provide SES commands to SES device server 320 via switched TCP/IP fabric 316.

In this embodiment, SES device server 320 includes a frontend SAS interface (I/F) 321 for receiving SES commands via the SSP transport layer, and further includes a frontend Ethernet interface (I/F) 322 for receiving SES commands via the TCP/IP transport layer. Control unit 323 of SES device server 320 consults security tables stored within memory 324 in order to determine whether a received SES command came from an authorized device. The security tables in this embodiment include SAS security table 324-1, for checking SES communications received via SAS I/F 321, and TCP/IP security table 324-2, for checking SES communications received via Ethernet I/F 322. In further embodiments where interfaces 321-322 utilize different protocols, a separate security table may be used for each protocol supported by the interfaces, or a single security table may be utilized to store authorization information for many different interfaces and/or protocols at once. The security tables used in FIG. 3 may be populated, for example, by an operator of the system utilizing a management port or other interface to configure SES device server 320.

Control unit 323 may utilize security tables 324-1 and 324-2 in order to determine not only whether a given SCSI initiator is an authorized device, but also to determine the type of commands which the SCSI initiator is allowed to perform (i.e., the "level" or "tier" of access permitted). For example, a security table may indicate that a SCSI initiator is only allowed to check the status information of peripheral devices, or may indicate that a limited set of SES commands are authorized for the SCSI initiator. In further embodiments, the security tables may indicate that a SCSI initiator is authorized to manipulate a limited set of peripheral devices using SES commands.

If control unit 323 determines that a given SES command was received from an authorized SCSI initiator according to the information in the security tables, it may further initiate processing at a backend peripheral interface (I/F) 325 in order to perform the received SES command.

FIG. 4 is a block diagram illustrating exemplary security tables used to authorize SCSI initiators in accordance with features and aspects hereof. Specifically, FIG. 4 depicts SAS security table 410 and TCP/IP security table 420. According to FIG. 4, SAS security table 410 includes entries that authorize SAS devices to perform various SES functions. Each entry indicates a set of SAS addresses (e.g., a range of SAS addresses). For example, one entry in SAS security table 410 may allow a large range of SAS addresses limited permissions (such as viewing the status of a peripheral device), while another entry may allow narrow ranges of SAS addresses (e.g., a single SAS address) full permission to perform all SES commands. In addition to a set of SAS addresses, each entry includes a set of SES page codes (herein, shown as a range of SES page codes). SES page codes correspond to SES commands. Thus, enabling a range of page codes for a set of devices enables the devices to perform a corresponding range of SES commands.

SAS security table 410 further includes a "status request only" indicator for each entry. If an entry has "status request only" set to true, then the devices associated with that entry may only view status information of peripheral devices, and may not change the status of the peripheral devices.

In further embodiments, SAS security table 410 may further indicate a set or type of peripheral devices. This may enable the SAS addresses to perform the various allowed SES functions on a limited set of peripheral devices (e.g., the SES functions may be allowed for one or more of temperature sensors, fans, power supplies, specifically indicated peripheral devices, etc.). TCP/IP security table 420 is substantially similar to SAS security table 410, but may include Internet Protocol (IP) addresses instead of SAS addresses.

Figure 5:
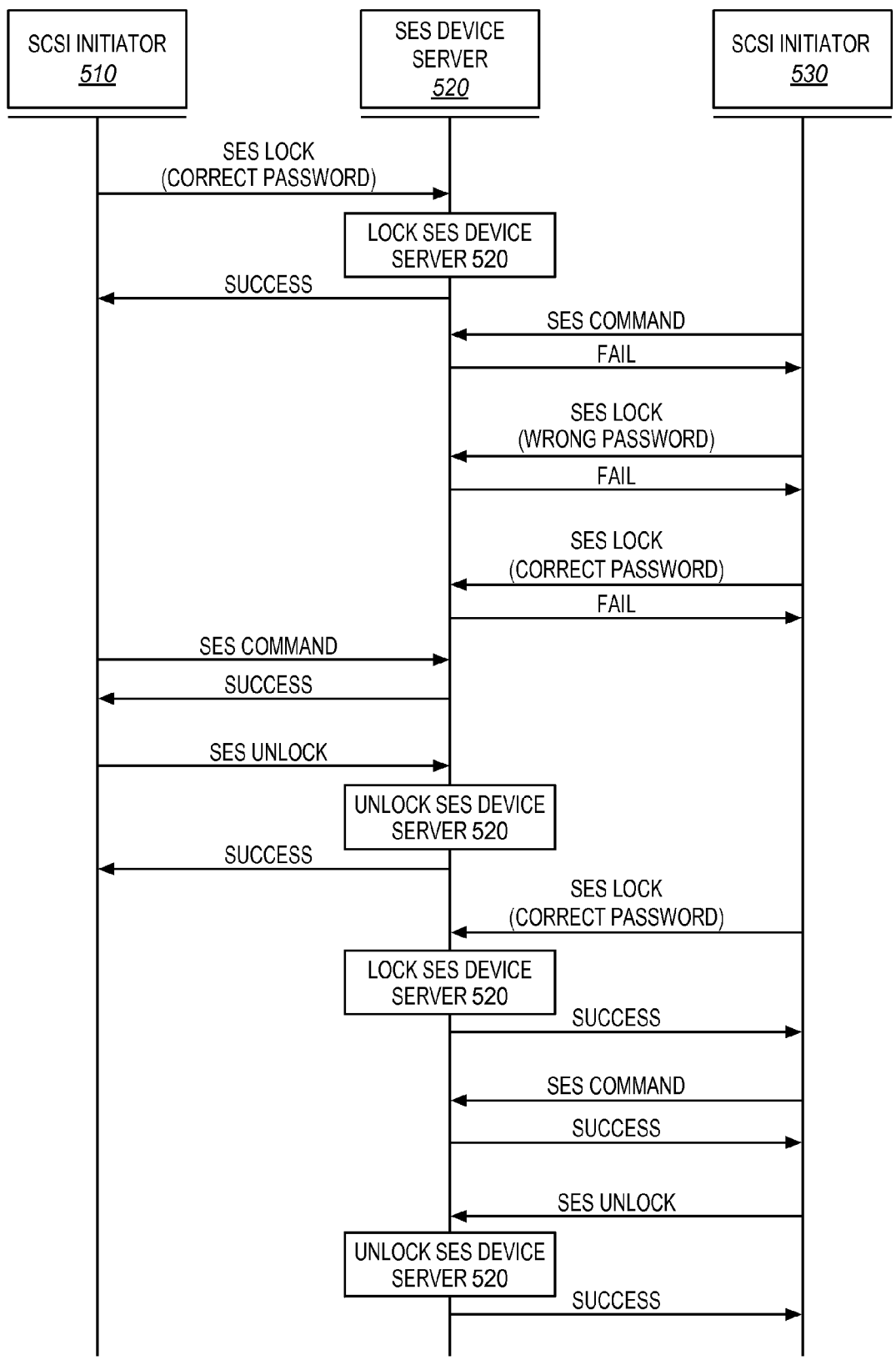
FIG. 5 is a message diagram illustrating communications between SAS initiators and an SES device server in accordance with features and aspects hereof.

FIG. 5 is a message diagram illustrating communications between SAS initiators and SES device server 520 in accordance with features and aspects hereof. FIG. 5 represents another exemplary embodiment as distinguished from that described with regard to FIGS. 3-4, although features of FIGS. 3-4 may be implemented within the system described for FIG. 5, and vice versa. In this embodiment, SCSI initiators may "lock" SES device server 520 in order to ensure that no other SCSI initiators interfere with SES commands sent to SES device server 520. A SCSI initiator, upon completing its desired tasks for SES device server 520, may then "unlock" SES device server 520 to allow other initiators to lock it and perform their own SES-related tasks.

According to FIG. 5, SCSI initiator 510 contacts SES device server 520 by transmitting a vendor-specific SES command herein referred to as an SES LOCK. The SES LOCK includes a password that matches a password stored in memory of SES device server 520. SES device server 520, upon processing the SES LOCK command, locks itself so that only SES commands from SCSI initiator 510 are enabled, and SES commands from other SCSI initiators are rejected. Thus, at this time SES device server 520 is effectively reserved for SCSI initiator 510 and SCSI initiator 510 alone. SES device server 520 further transmits an indication to SCSI initiator 510 that the lock has been successfully performed.

Next, SCSI initiator 530, which has not locked SES device server 520, attempts to perform SES commands upon SES device server 520. SCSI initiator 530 first sends an SES command to SES device server 520, but SES device server 520 replies with a FAIL because SES device server 520 is in a locked state. SCSI initiator 530 then attempts to perform an SES LOCK of SES device server 520, but with the wrong password, and SES device server 520 sends another FAIL in reply. At this point, SCSI initiator 530 sends an SES LOCK command with the appropriate password information. However, because SES device server 520 is in the locked state, it sends yet another fail to SCSI initiator 530.

During the locked state, SCSI initiator 510, which has locked SES device server 520, sends one or more SES commands to SES device server 520. SES device server 520 then performs the received commands and replies with an indication that the commands have been completed successfully. When SCSI initiator 510 has finished its various SES management tasks, it transmits a vendor specific SES UNLOCK command to SES device server 520. SES device server 520 therefore exits the locked state. SES device server 520 further sends an indicator to SCSI initiator 510 that the unlock has been performed successfully.

At this point, SCSI initiator 530 transmits another SES LOCK command with the correct password information. Because SES device server 520 is currently in an unlocked state, it processes the SES LOCK command, SCSI device server 520 enters the locked state, and transmits an indicator of success to SCSI initiator 530. SCSI initiator 530 then transmits SES commands and receives indicators of success from SES device server 520. When SCSI initiator 530 completes the desired SES functions, it then sends an SES UNLOCK command to SES device server 520. SES device server 520 therefore places itself into an unlocked state, and indicates to SCSI initiator 530 that the unlock has been successfully performed.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A SCSI Enclosure Services (SES) device server, the SES device server comprising:
    a frontend interface operable to receive SES commands generated by Small Computer System Interface (SCSI) devices;
    a backend interface operable to manage operations of at least one peripheral device communicatively coupled with the SES device server based on received SES commands; and
    a control unit operable to determine whether a SCSI initiator that generated a received SES command is an authorized device, operable to perform the SES command in response to determining that the SCSI initiator is an authorized device, and further operable to reject the SES command in response to determining that the SCSI initiator is not an authorized device, wherein
    there are multiple SCSI initiators, and
    the control unit is further operable to maintain a security table that correlates an address of each SCSI initiator with one of multiple permission levels, where each permission level enables access by a SCSI initiator to a different range of SES commands.

2. The SES device server of claim 1, further comprising:
a memory that stores authorized addresses of SCSI initiators, wherein
the control unit is further operable to access the authorized addresses stored within the memory, operable to determine whether an address of the SCSI initiator corresponds to an authorized address in the memory, operable to determine that the SCSI initiator is an authorized device responsive to determining that the address of the SCSI initiator corresponds to an authorized address in the memory, and further operable to determine that the SCSI initiator is not an authorized device responsive to determining that the address of the SCSI initiator does not correspond to an authorized address stored within the memory.

3. The SES device server of claim 1, further comprising:
a memory that stores passcode information, wherein
the control unit is further operable to receive, via the frontend interface, a communication from the SCSI initiator that includes passcode information, operable to determine if the received passcode information matches the passcode information stored in the memory, and further operable to determine that the SCSI initiator is an authorized device if the received passcode information matches the passcode information stored in the memory.

4. The SES device server of claim 3 wherein:
the communication from the SCSI initiator that includes the received passcode information is a vendor-specific SES command.

5. The SES device server of claim 3 wherein:
the control unit is further operable to enter a locked state in response to determining that the SCSI initiator is an authorized device, where during the locked state the control unit rejects SES commands provided by authorized devices that are not the SCSI initiator.

6. The SES device server of claim 5 wherein:
the control unit is further operable to receive, via the frontend interface, a request from the SCSI initiator to unlock the SCSI initiator and is further operable to exit the locked state responsive to receiving the request.

7. The SES device server of claim 1 wherein:
the control unit is further operable to adjust a speed of a fan at a storage enclosure managed by the SES device server based on the SES command.

8. The SES device server of claim 7 wherein:
each permission level is defined by entries in the security table that list a range of authorized SES page codes, each SES page code corresponding to one or more SES commands.

9. A method comprising:
receiving, at a frontend interface of a SCSI Enclosure Services (SES) device server, SES commands generated by Small Computer System Interface (SCSI) devices;
determining, at the SES device server, whether SCSI initiators that generated received SES commands are authorized devices;
performing an SES command in response to determining that a SCSI initiator that generated the SES command is an authorized device;
rejecting an SES command in response to determining that a SCSI initiator that generated the SES command is not an authorized device; and
maintaining a security table that correlates an address of each SCSI initiator with one of multiple permission levels, where each permission level enables access by a SCSI initiator to a different range of SES commands.

10. The method of claim 9, wherein analyzing the received SES commands comprises:
   accessing authorized addresses stored within a memory of the SES device server;
   determining whether an address of a SCSI initiator corresponds to an authorized address in the memory;
   determining that the SCSI initiator is an authorized device responsive to determining that the address of the SCSI initiator corresponds to an authorized address in the memory; and
   determining that the SCSI initiator is not an authorized device responsive to determining that the address of the SCSI initiator does not correspond to an authorized address stored within the memory.

11. The method of claim 9, further comprising:
   receiving, via the frontend interface, a communication from a SCSI initiator that includes passcode information;
   determining if the received passcode information matches passcode information stored in a memory of the SES device server; and
   determining that the SCSI initiator is an authorized device if the received passcode information matches the passcode information stored in the memory.

12. The method of claim 11, wherein:
   the communication from the SCSI initiator that includes the received passcode information is a vendor-specific SES command.

13. The method of claim 11, further comprising:
   entering a locked state in response to determining that the SCSI initiator is an authorized device, where during the locked state incoming SES commands provided by authorized devices that are not the SCSI initiator are rejected.

14. The method of claim 13, further comprising:
   receiving, via the frontend interface, a request from the SCSI initiator to unlock the SCSI initiator; and
   exiting the locked state responsive to receiving the request.

15. The method of claim 9, wherein the method further comprises:
   adjusting a speed of a fan at a storage enclosure managed by the SES device server based on the SES command.

16. The method of claim 15, wherein:
   each permission level is defined by entries in the security table that list a range of authorized SES page codes, each SES page code corresponding to one or more SES commands.

17. A non-transitory computer readable medium embodying programmed instructions which, when executed by a processor, are operable for performing a method in a SCSI Enclosure Services (SES) device server, the method comprising:
   receiving, at a frontend interface of a SCSI Enclosure Services (SES) device server, SES commands generated by Small Computer System Interface (SCSI) devices;
   determining, at the SES device server, whether SCSI initiators that generated received SES commands are authorized devices;
   performing an SES command in response to determining that a SCSI initiator that generated the SES command is an authorized device;
   rejecting an SES command in response to determining that a SCSI initiator that generated the SES command is not an authorized device; and
   maintaining a security table that correlates an address of each SCSI initiator with one of multiple permission levels, where each permission level enables access by a SCSI initiator to a different range of SES commands.

18. The medium of claim 17, wherein analyzing the received SES commands comprises:
   accessing authorized addresses stored within a memory of the SES device server;
   determining whether an address of a SCSI initiator corresponds to an authorized address in the memory;
   determining that the SCSI initiator is an authorized device responsive to determining that the address of the SCSI initiator corresponds to an authorized address in the memory; and
   determining that the SCSI initiator is not an authorized device responsive to determining that the address of the SCSI initiator does not correspond to an authorized address stored within the memory.

19. The medium of claim 17, wherein the method further comprises:
   receiving, via the frontend interface, a communication from a SCSI initiator that includes passcode information;
   determining if the received passcode information matches passcode information stored in a memory of the SES device server; and
   determining that the SCSI initiator is an authorized device if the received passcode information matches the passcode information stored in the memory.

20. The medium of claim 17, wherein:
   the communication from the SCSI initiator that includes the received passcode information is a vendor-specific SES command.

* * * * *